(12) United States Patent
Funahashi et al.

(10) Patent No.: US 7,488,907 B2
(45) Date of Patent: Feb. 10, 2009

(54) LEVER SWITCH DEVICE

(75) Inventors: Masane Funahashi, Aichi (JP); Hiroshi Kusama, Aichi (JP); Norikazu Yoshida, Aichi (JP); Fumitaka Hayase, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 11/342,603

(22) Filed: Jan. 31, 2006

(65) Prior Publication Data

US 2006/0180445 A1    Aug. 17, 2006

(30) Foreign Application Priority Data

Feb. 1, 2005    (JP)    ............ P. 2005-025154

(51) Int. Cl.
*H01H 9/00*    (2006.01)
(52) U.S. Cl. .................. 200/61.54; 200/61.57
(58) Field of Classification Search ... 200/61.51–61.57, 200/61.27–61.38, 4, 292, 512–517
See application file for complete search history.

(56) References Cited

U.S. PATENT DOCUMENTS

| | | | |
|---|---|---|---|
| 6,025,565 A * | 2/2000 | Miyase et al. ............ | 200/61.28 |
| 6,150,620 A * | 11/2000 | Luley et al. ............... | 200/61.27 |
| 6,260,431 B1 * | 7/2001 | Yokoyama ................. | 74/469 |
| 6,365,852 B1 * | 4/2002 | Leng et al. ................ | 200/61.54 |
| 6,495,776 B1 * | 12/2002 | Takahashi et al. ......... | 200/61.54 |
| 6,566,616 B1 * | 5/2003 | Ha ........................... | 200/61.54 |
| 6,756,550 B2 * | 6/2004 | Ficek et al. ............... | 200/61.54 |
| 6,849,815 B2 * | 2/2005 | Leng ........................ | 200/61.54 |

FOREIGN PATENT DOCUMENTS

JP    UM-B-58-52581    11/1983

* cited by examiner

*Primary Examiner*—Michael A Friedhofer
*Assistant Examiner*—Lisa N Klaus
(74) *Attorney, Agent, or Firm*—Morgan, Lewis & Bockius LLP

(57) ABSTRACT

A third insulator of a washer switch constituting the second electrical switching unit is set to be long in the axial direction, the insulator is provided with fixed contacts extending in the axial direction and at the same time a base portion thereof is provided with connecting terminals, and the connecting terminals are disposed in the vicinity of the connecting terminals of a wiper switch constituting the first electrical switching unit. Second lead wire and third lead wire are connected to the connecting terminals, respectively.

2 Claims, 5 Drawing Sheets

LEVER SWITCH DEVICE

BACKGROUND OF THE INVENTION

The present invention relates to a lever switch device including a first rotary electrical switching unit and a second push-type electrical switching unit in the vicinity of the tip portion of a shaft part of a lever.

There is known a lever combination switch device of a vehicle, which includes a first electrical switching unit constituted by a rotary switch operated by a rotating operation of a knob and a second electrical switching unit composed of a push-type switch operated by a pushing operation of a push-button in the vicinity of the tip portion of the cylindrical shaft part of the lever (for example, refers to Patent Document 1).

In this case, an insulator of the first rotary electrical switching unit is disposed inside the knob at the periphery of the shaft part. Fixed contacts and connecting terminals are provided to the insulator. Further, the second push-type electrical switching unit is an opposing type in which the fixed contacts and the movable contacts oppose to each other, and the fixed contact is provided to the tip of the shaft part. Further, lead wires penetrating through the lever are connected to connecting terminals of the first electrical switching unit and the connecting terminals of the fixed contact of the second electrical switching unit, respectively.

Patent Document 1: JP-UM-B-58-52581

However, the conventional switch device having the above-described construction has the following disadvantage. Specifically, since the connecting terminals of the fixed contacts in the second electrical switching unit disposed at the tip portion of the shaft part are disposed closer to the tip portion side of the shaft part than the insulator of the first electrical switching unit, it needs to wire the lead wire to the tip portion of the front shaft further than the insulator of the first electrical switching unit. Further, since the position of the connecting terminals of the insulator in the first electrical switching unit and the position of the connecting terminals of the fixed contact in the second electrical switching unit are deviated in the axial direction, connection positions between the connecting terminals and the lead wires are deviated from each other in the axial direction.

SUMMARY OF THE INVENTION

The invention has been made to solve the above-mentioned problems, and an object of the invention is to provide a lever switch device including a first rotary electrical switching unit, and a second push-type electrical switching unit in the vicinity of the tip portion of a shaft part, in which connection places between the connecting terminals of the first electrical switching unit and the lead wires, and connection places between the connecting terminals of the second electrical switching unit and lead wires can be made close as much as possible, and a wiring of the lead wire connected to the connecting terminal of the second electrical switching unit can be made easy.

In order to solve the aforesaid object, the invention is characterized by having the following arrangement.

(1) A lever switch device comprising:
  a lever main body including a cylindrical shaft part extending in an axial direction;
  a first rotary electrical switching unit including:
    a knob provided in the vicinity of a tip portion of the shaft part so as to rotate around the shaft part, wherein setting condition thereof is switched depending on a rotational operation of the knob; and
    a first connecting terminal electrically connected to a lead wire passing through the lever main body; and
  a second push-type electrical switching unit including:
    a push-button provided in the vicinity of the tip portion of the shaft part so as to be reciprocated in the axial direction, wherein setting condition thereof is switched depending on a pushing operation of the push-button;
    a fixed contact extending in the axial direction; and
    a second connecting terminal electrically connected to the fixed contact and a lead wire passing through the lever main body,
  wherein the second connecting terminal is disposed in the vicinity of the first connecting terminal.

(2) The lever switch device of (1), wherein the fixed contact is disposed on a side surface of an insulator disposed inside the shaft part so as to extend in the axial direction, the second connecting terminal is disposed at a base portion of the insulator, and the second electrical switching unit includes a movable contact that slides on the side surface of the insulator to come in contact with and be separated from the fixed contacts.

According to the present invention, since the connecting terminals of the fixed contact in the second electrical switching unit is disposed in the vicinity of the connecting terminals in the first electrical switching unit, the connection places between the connecting terminals of the first electrical switching unit and the lead wire and the connection places between the connecting terminals of the second electrical switching unit and the lead wires can be made close as much as possible. Further, since the tip of the lead wire to be connected to the connecting terminals of the second electrical switching unit is preferably wired to the substantially same position as that of the tip of the lead wire to be connected to the connecting terminals of the second electrical switching unit, the wiring of the lead wire to be connected to the connecting terminals of the second electrical switching unit can be made easy.

BRIEF DESCRIPTION OF THE DRAWINGS

FIGS. 2A and 2B are view illustrating main parts of a washer switch, in which FIGS. 2A and 2B illustrate an OFF-stat and an ON-state, respectively.

DETAILED DESCRIPTION OF PREFERRED EMBODIMENTS

Figure 1:
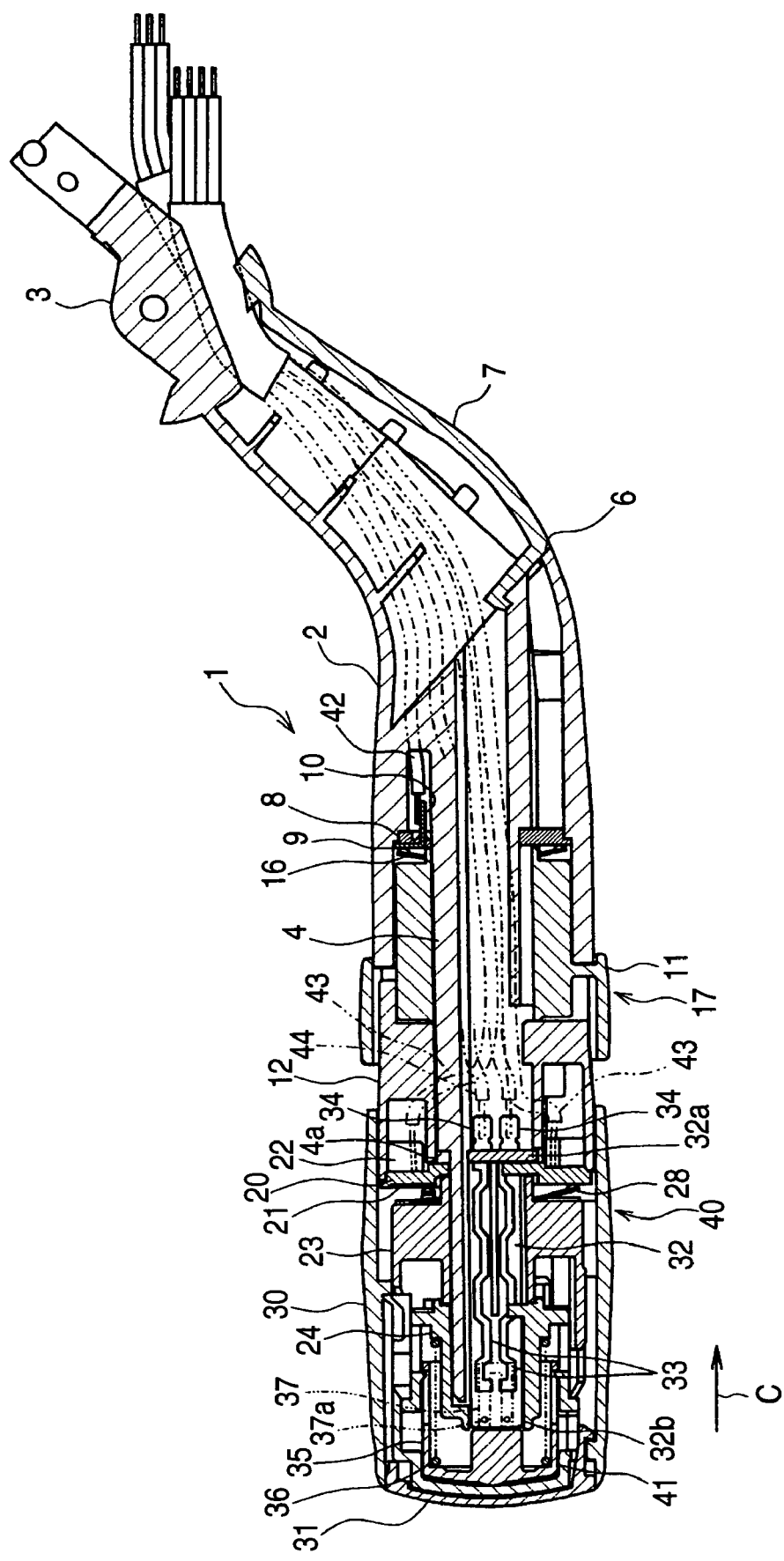
FIG. 1 is a cross-sectional view illustrating an embodiment of the invention.
Figure 2A:
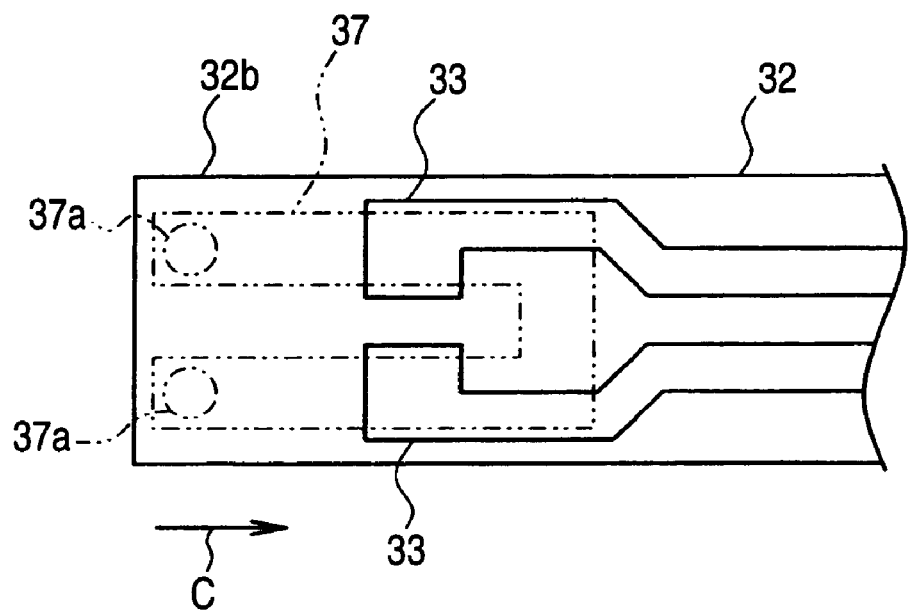
Figure 2B:
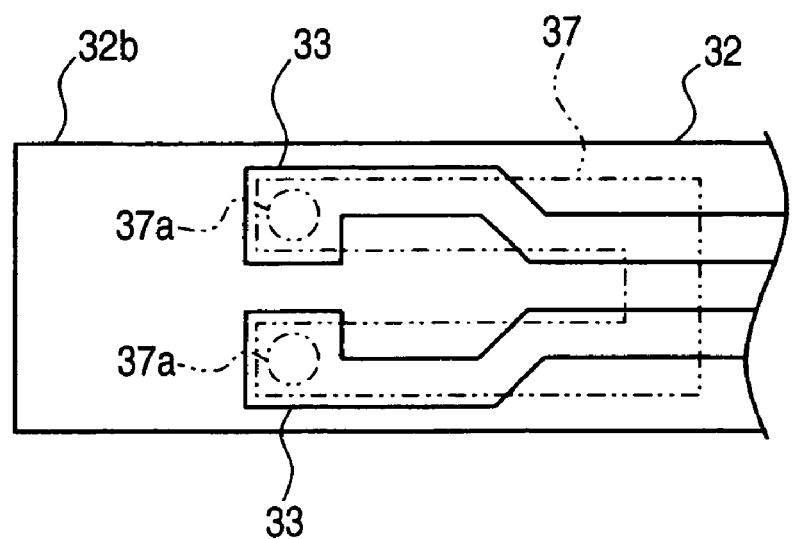
Figure 3:
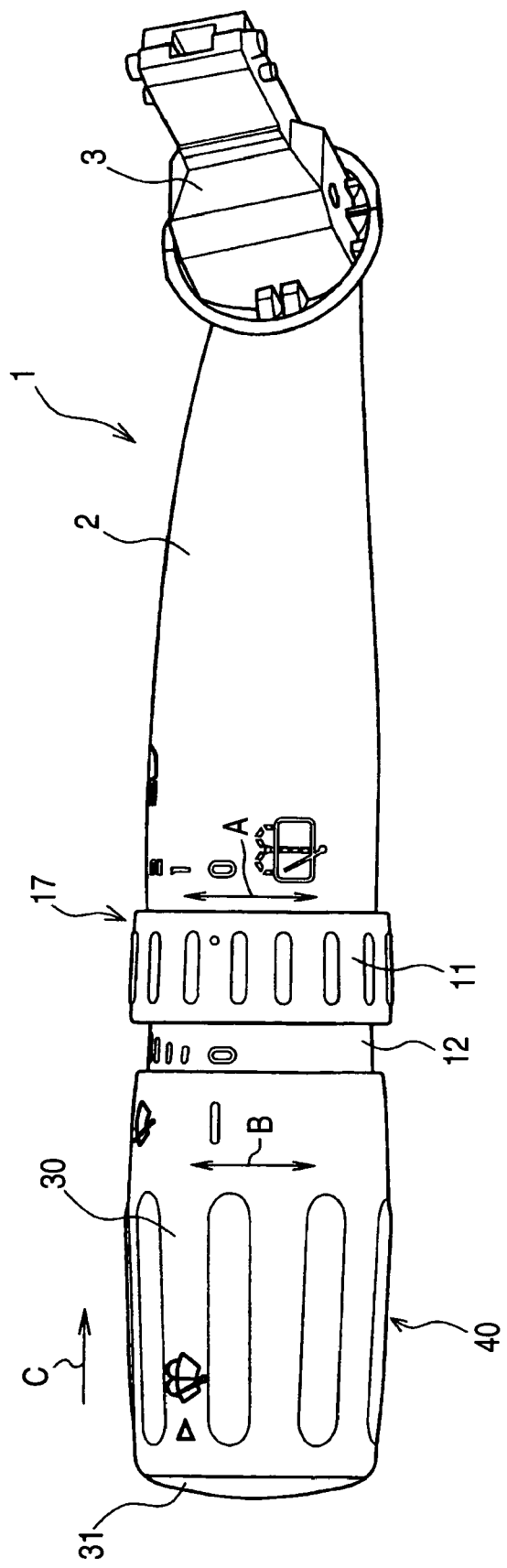
FIG. 3 is a plan view illustrating an entire external appearance.

Hereinafter, a preferred embodiment of the invention will be described with reference to accompanying drawings. A lever switch device according to the present embodiment is a switch used as a lever combination switch, which is provided to a column portion of a steering wheel in a vehicle. FIG. 3 is a plan view illustrating an external appearance of a lever switch device 1, FIG. 1 is a cross-sectional view showing the lever switch device 1, each of FIGS. 2A and 2B is a plan view illustrating main parts, FIG. 4 is an entire exploded perspective view of the lever switch device 1, and FIG. 5 is an exploded perspective view illustrating the main parts as seen from the opposite side to that shown in FIG. 4.

Figure 4:
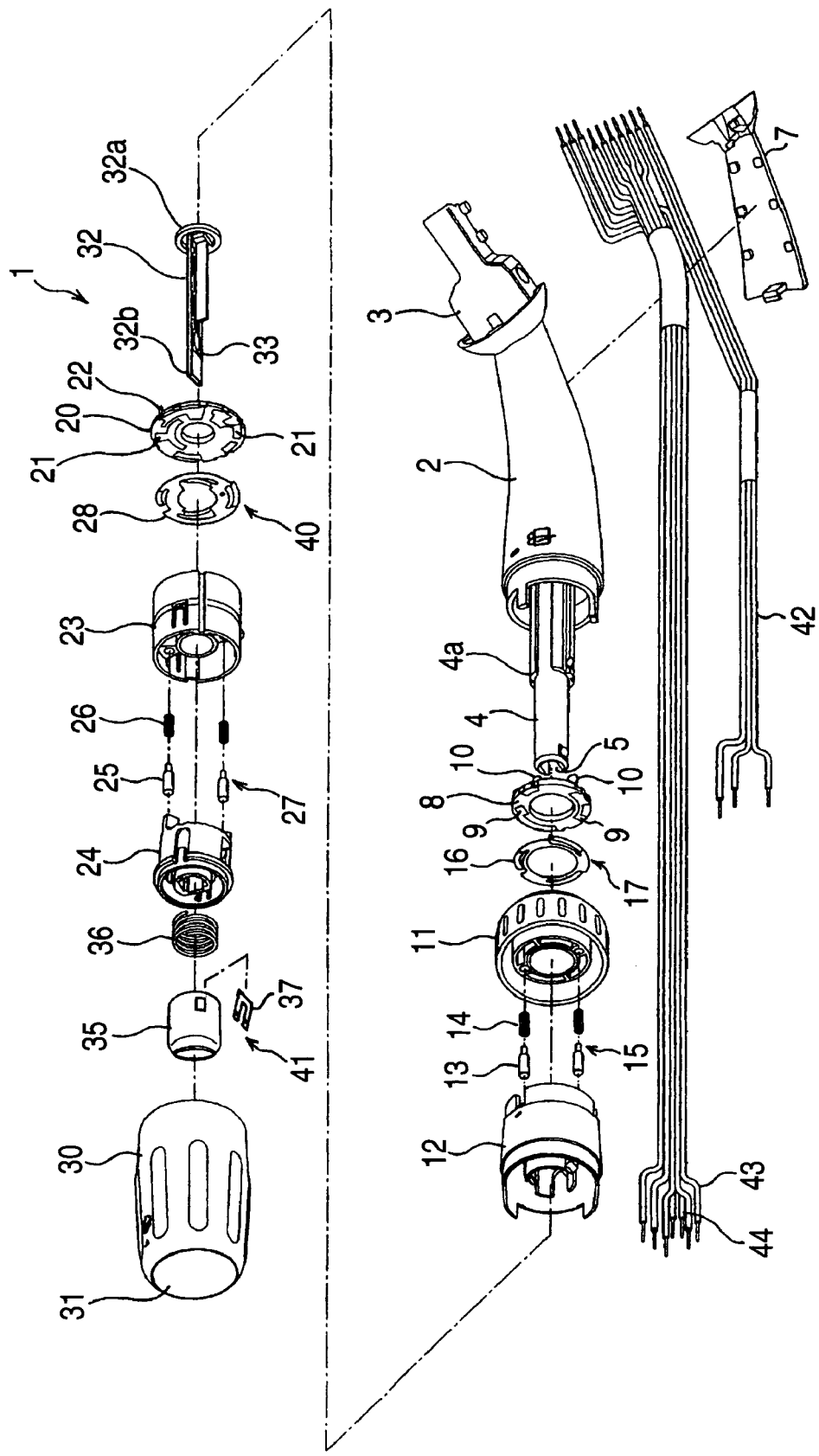
FIG. 4 is an entire exploded perspective view.
Figure 5:
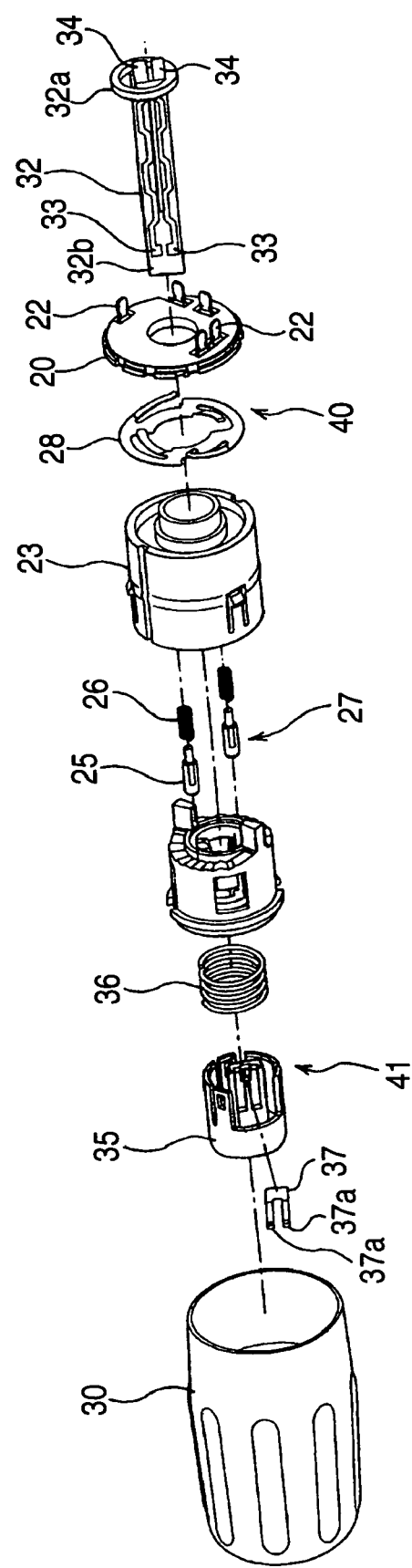
FIG. 5 is a perspective view of the main part as seen from the opposite side to that shown in FIG. 4.

First, in FIGS. 3 and 4, a lever main body 2 of the lever switch device 1 is made of synthesis resin to have a hollow shape, and has an attachment part 3 at one end portion thereof (a right end portion in FIGS. 1, 3, and 4), which serves as a base portion, and a shaft part 4 which has an elongated cylindrical shape and is integrally formed with the attachment part 3 at the other end portion thereof, which serves as a tip portion. A slit 5 (see FIG. 4) extending in an axial direction is formed on the shaft part 4. As shown in FIG. 1, a cover 7 for closing an opening 6, which is formed on the lever main body 2, is detachably attached to the base portion of the lever main body 2.

A first insulator 8 which is formed to be a ring-shaped disk is fixedly attached to a periphery of the shaft part 4 facing the base portion (a right side in FIG. 1) thereof. The first insulator 8 is provided with a plurality of fixed contacts 9 and connecting terminals 10 electrically connected to the fixed contacts 9. A first rotary knob 11, which has a double cylindrical shape and is disposed closer to the tip portion (a left side in FIG. 1) than the first insulator 8, is provided at the periphery of the shaft part 4 so as to rotate around the shaft part 4. Further, an intermediate member 12 is fixedly attached to the periphery of the shaft part 4 so as to be closer to the tip portion than the first rotary knob 11. A detent mechanism 15 (see FIG. 4) having stopping pieces 13 and stopping springs 14 is disposed between the intermediate member 12 and the first rotary knob 11. The detent mechanism 15 applies a detent feeling to the first rotary knob 11.

A movable contact 16 is attached to the first rotary knob 11 so as to face the first insulator 8. As the first rotary knob 11 is rotated, the movable contact 16 slides on a surface of the first insulator 8 so as to come in contact with and be separated from the fixed contacts 9. In this case, a rear wiper switch 17 is constituted by the first insulator 8, the fixed contacts 9 and connecting terminals 10 provided to the first insulator 8, the first rotary knob 11, and the movable contact 16 which is rotatably operated by the first rotary knob 11.

A second insulator 20 having the shape of a ring-shaped disk is fixedly attached to the periphery of the shaft part 4 closer to the tip portion than the intermediate member 12. The second insulator 20 is disposed adjacent to a stepped portion 4a of the shaft part 4. The second insulator 20 is provided with a plurality of fixed contacts 21 and a plurality of connecting terminals 22 electrically connected to the fixed contacts 21. Further, a contact holder 23 is provided on the periphery of the shaft part 4 closer to the tip portion than the second insulator 20 so as to rotate around the shaft part 4. Furthermore, a stator 24 is fixedly attached to the periphery of the shaft part 4 closer to the tip portion than the contact holder 23. A detent mechanism 27 having detent pieces 25 and detent springs 26 is provided between the contact holder 23 and the stator 24. When the contact holder 23 is rotated, the detent feeling is obtained by the detent mechanism 27. A movable contact 28 is attached to the side of the contact holder 23 facing the second insulator 20. As the second holder 23 is rotated, the movable contact 28 slides on a surface of the second insulator 20 so as to come in contact with and be separated from the fixed contacts 21.

A second rotary knob 30, which is formed in a cylindrical shape so as to have one end thereof closed, is provided at the tip portion of the shaft part 4 to cover the second insulator 20, the contact holder 23, and the stator 24. The second rotary knob 30 is attached to the contact holder 23 so as to rotate around the shaft part 4 with the contact holder 23 as one unit, and to be reciprocated in the axial direction with respect to the contact holder 23 and the stator 24. Further, a decoration cap 31 is attached to the tip portion of the second rotary knob 30.

A third insulator 32 is inserted into the inside of the shaft part 4 at the tip portion thereof. The base portion 32a of the third insulator 32 is fixed to the shaft part 4 in the vicinity of the stepped portion 4a and extends therefrom in the axial direction in the shape of a plate, and a tip portion 32b of the third insulator 32 reaches to the tip portion of the shaft part 4. A pair of fixed contacts 33 is provided on a side surface of the third insulator 32 to extend in the axial direction. Connecting terminals 34 (see FIGS. 1 and 5) electrically connected to the fixed contacts 33 are provided at the base portion 32a of the third insulator 32. In this case, the connecting terminals 34 are disposed in the vicinity of the connecting terminals 22 of the second insulator 20.

A push-button 35, which is formed in a cylindrical shape so as to have one end thereof closed, is disposed inside the tip portion of the second rotary knob 30 to cover the stator 24 from the tip thereof. The push-button 35 can be reciprocated in the axial direction of the shaft part 4, and cannot rotate around the shaft of the stator 24. A compression coil spring 36 constituting a biasing member is disposed between the push-button 35 and the stator 24 so that the push-button 35 and the second rotary knob 30 are biased in the axial direction of the shaft part 4 toward outside by the biasing force of the compression coil spring 36. A U-shaped movable contact 37 made of a leaf spring is attached to the inside of the push-button 35. Accordingly, as the push-button 35 moves in the axial direction, a pair of contacting portions 37a of the movable contact 37 slides on the side surface of the third insulator 32 to come in contact with and be separated from the fixed contacts 33.

Here, the lever main body 2, the cover 7, the first rotary knob 11, the intermediate member 12, and the second knob 30 constitute the lever.

Further, the second insulator 20, the fixed contacts 21 and the connecting terminals 22 provided to the second insulator 20, the second rotary knob 30, the contact holder 23 rotated by the second rotary knob 30, and the movable contact 28 provided to the contact holder 23 constitute a wiper switch 40 for the front window. The wiper switch 40 constitutes a rotary first electrical switching unit of the invention.

Furthermore, the third insulator 32, the fixed contacts 33 and connecting terminals 34 provided to the third insulator, the push-button 35, the compression coil spring 36, and the movable contact 37 constitute a washer switch 41 for the front window. The washer switch 41 constitutes a second push-type electrical switching unit according to the invention. In this case, in a non-operation state in which the washer switch 41 does not perform the pushing operation, the contacting portions 37a of the movable contact 37 are separated from the fixed contacts 33 in the axial direction to be in off-state (see FIG. 2A).

Further, a first lead wire 42 for the rear wiper switch 17, a second lead wire 43 for the wiper switch 40, and a third lead wire 44 for the washer switch 41 are wired inside the lever. Among them, the tip portion of the first lead wire 42 is electrically connected to the connecting terminal 10 of the first insulator 8 in the inside of the lever main body 2. Furthermore, the tip portion of the second lead wire 43 is electrically connected to the connecting terminals 22 of the second insulator 20 in the inside of the intermediate member 12. In addition, the tip portion of the third lead wire 44 is electrically connected to the connecting terminal 34 of the third insulator 32 in the inside of the shaft part 4 and in the vicinity of the connecting terminals 22.

In the above-described construction, the movable contact 16 is rotated in the same direction on the basis of the rotation of the first rotary knob 11 (see an arrow A in FIG. 3). On the basis of this operation, a setting condition of the rear wiper switch 17 is switched. On the basis of the rotation of the second rotary knob 30 (see an arrow B in FIG. 3), the movable contact 28 is rotated in the same direction through the contact holder 23. On the basis of this operation, a setting condition of the wiper switch 40 is switched. At this time, since the push-button 35 cannot be rotated, the push-button is not rotated even though the second rotary knob 30 is rotated.

On the other hand, when the second rotary knob 30 is pushed in the direction of an arrow C in FIGS. 1 and 3, the push-button 35 compressed by the second rotary knob 30 moves in the direction of the arrow C. In this way, the movable contact 37 attached to the push-button 35 moves in the direction of the arrow C, so that the pair of contact portions 37a of the movable contact 37 comes in contact with the pair of fixed contacts 33 (see FIG. 2B), whereby the washer switch 41 is switched into On-state. Further, when the compressive force in the direction of the arrow C applied to the second rotary knob 30 is released, the push-button 35 and the second rotary knob 30 move in the direction opposite to the arrow C by the biasing force of the compression coil spring 36. Furthermore, in accordance with this operation, the movable contact 37 also moves in the same direction, so that the pair of contact portions 37a is separated from the pair of fixed contacts 33 (see FIG. 2A), whereby the washer switch 41 is switched into OFF-state.

According to the above-described embodiment, in the lever switch device including the rotary wiper switch 40 and the push-type washer switch 41 in the vicinity of the tip portion of the shaft part 4 of the lever, the third insulator 32 of the washer switch 41 is set to extend in the axial direction and the fixed contacts 33 are also set to extend in the axial direction, the connecting terminals 34 electrically connected to the fixed contacts 33 are disposed in the vicinity of the connecting terminals 22 of the rotary wiper switch 40, and the second and third lead wires 43 and 44 penetrating through the lever are electrically connected to the connecting terminals 34 and 22, respectively. For this reason, the connection places between the second lead wires 43 and the connecting terminals 22 of the wiper switch 40, and the connection places between the third lead wires 44 and the connecting terminals 34 of the washer switch 41 can be made close as much as possible. Further, since it is sufficient to wire the tip of the third lead wire 44 connected to the connecting terminals 34 of the washer switch 41 and the tip of the second lead wire 43 connected to the connecting terminals 22 of the wiper switch 40, to a substantially same position, it is not necessary that the tip of the third lead wire 44 reach the tip portion of the shaft part 4. Accordingly, it is possible to easily wire the third lead wire 44.

The invention is not limited to the above-described embodiment, and can be variously modified and extended as the following description.

Instead of the switching unit, A variable resistor may be used as the first electrical switching unit.

Instead of the slide-type switch, an opposed type switch can be used as the washer switch 41 constituting the second switching unit.

Further, the washer switch 41 can be constructed so as to directly press the push-button 35.

What is claimed is:

1. A lever switch device comprising:
   a lever main body including a cylindrical shaft part extending in an axial direction;
   a rotary electrical switching unit including:
   a knob provided in the vicinity of a tip portion of the shaft part so as to rotate around the shaft part, wherein setting condition thereof is switched depending on a rotational operation of the knob; and
   a first connecting terminal provided in the vicinity of a tip portion of the shaft part so as to be electrically connected to a first lead wire passing through the lever main body; and
   a push-type electrical switching unit including:
   a push-button provided in the vicinity of the tip portion of the shaft part so as to be reciprocated in the axial direction, wherein setting condition thereof is switched depending on a pushing operation of the push-button;
   a fixed contact extending in the axial direction; and
   a second connecting terminal provided in the vicinity of a tip portion of the shaft part so as to be electrically connected to the fixed contact and a second lead wire passing through the lever main body,
   wherein the first lead wire passing through the lever main body is electrically connected to the first connecting terminal in the vicinity of the tip portion of the shaft part, a tip of the first lead wire connected to the first connecting terminal and a tip of the second lead wire connected to the second connecting terminal are positioned substantially in a same axial position within the shaft part, and
   wherein the second connecting terminal is disposed in the vicinity of the first connecting terminal.

2. The lever switch device according to claim 1, wherein
   the fixed contact is disposed on a side surface of an insulator disposed inside the shaft part so as to extend in the axial direction,
   the second connecting terminal is disposed at a base portion of the insulator, and
   the push-type electrical switching unit includes a movable contact that slides on the side surface of the insulator to come in contact with and be separated from the fixed contacts.

* * * * *